United States Patent
Jay et al.

(10) Patent No.: US 9,874,087 B2
(45) Date of Patent: Jan. 23, 2018

(54) DOWNHOLE TEMPERATURE PROBE ARRAY

(75) Inventors: Phillip Lucas Jay, Spring, TX (US); Gary James Frisch, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 40 days.

(21) Appl. No.: 13/390,893

(22) PCT Filed: Sep. 18, 2009

(86) PCT No.: PCT/US2009/057564
§ 371 (c)(1),
(2), (4) Date: Feb. 16, 2012

(87) PCT Pub. No.: WO2011/034542
PCT Pub. Date: Mar. 24, 2011

(65) Prior Publication Data
US 2012/0158307 A1 Jun. 21, 2012

(51) Int. Cl.
| | |
|---|---|
| *G01V 1/40* | (2006.01) |
| *G01V 3/18* | (2006.01) |
| *G01V 5/04* | (2006.01) |
| *G01V 9/00* | (2006.01) |
| *E21B 47/06* | (2012.01) |
| *G01K 1/02* | (2006.01) |

(52) U.S. Cl.
CPC ............ *E21B 47/065* (2013.01); *G01K 1/026* (2013.01); *G01K 2213/00* (2013.01)

(58) Field of Classification Search
CPC ................ E21B 47/065; G01K 1/026
USPC .................................................... 702/11, 12
See application file for complete search history.

(56) References Cited

U.S. PATENT DOCUMENTS

| | | | |
|---|---|---|---|
| 3,327,527 A | 6/1967 | Arps | |
| 4,028,139 A | 6/1977 | Smith et al. | |
| 4,074,756 A * | 2/1978 | Cooke, Jr. ............ | E21B 43/119 166/277 |
| 4,370,886 A * | 2/1983 | Smith, Jr. ............ | E21B 47/065 175/40 |

(Continued)

FOREIGN PATENT DOCUMENTS

WO WO-2011034542 A1 3/2011

OTHER PUBLICATIONS

"International Application Serial No. PCT/US2009/057564, Search Report dated Nov. 5, 2009".

(Continued)

*Primary Examiner* — Michael Nghiem
(74) *Attorney, Agent, or Firm* — Gilliam IP PLLC

(57) ABSTRACT

An apparatus includes a tool configured to operate within a borehole during a period wherein matter is being output from a surrounding earth formation into a flow of matter in the borehole. The tool includes a main tool body having a longitudinal axis. A temperature probe array is coupled to the main tool body, including a first temperature probe and a second temperature probe. The first temperature probe is radially spaced from and is at a different circumferential position relative to the second temperature probe during operation. The first temperature probe and the second temperature probe are configured to measure a first temperature and a second temperature, respectively, during operation, wherein at least one of a type of matter in the flow and an entry point of the matter from the surrounding earth formation is derived using the first temperature and the second temperature.

20 Claims, 7 Drawing Sheets

(56) References Cited

U.S. PATENT DOCUMENTS

| | | | |
|---|---|---|---|
| 4,811,598 A * | 3/1989 | Dillier et al. | 374/136 |
| 5,531,112 A | 7/1996 | Young et al. | |
| 5,574,263 A | 11/1996 | Roesner | |
| 5,610,331 A | 3/1997 | Georgi | |
| 5,635,631 A | 6/1997 | Yesudas et al. | |
| 6,003,620 A | 12/1999 | Sharma et al. | |
| 6,176,323 B1 * | 1/2001 | Weirich | E21B 21/08 175/40 |
| 6,751,556 B2 | 6/2004 | Schroeder et al. | |
| 7,581,440 B2 | 9/2009 | Meek et al. | |
| 2006/0010973 A1 * | 1/2006 | Brown | G01F 1/68 73/204.11 |
| 2006/0064889 A1 * | 3/2006 | Fredette | G01B 7/13 33/544 |
| 2006/0157239 A1 * | 7/2006 | Ramos et al. | 166/254.2 |
| 2006/0196659 A1 * | 9/2006 | Jee et al. | 166/250.01 |
| 2007/0068672 A1 * | 3/2007 | Jalali et al. | 166/250.01 |
| 2007/0234789 A1 * | 10/2007 | Glasbergen et al. | 73/152.55 |
| 2009/0326826 A1 * | 12/2009 | Hull et al. | 702/8 |
| 2010/0018305 A1 * | 1/2010 | Maute et al. | 73/152.29 |
| 2010/0116492 A1 * | 5/2010 | Beard et al. | 166/255.1 |
| 2010/0212891 A1 * | 8/2010 | Stewart | E21B 23/00 166/250.12 |

OTHER PUBLICATIONS

"International Application Serial No. PCT/US2009/057564, Written Opinion dated Nov. 5, 2009".

"International Application Serial No. PCT/US2009/057564, International Preliminary Report on Patentability dated May 16, 2012", 4 pgs.

* cited by examiner

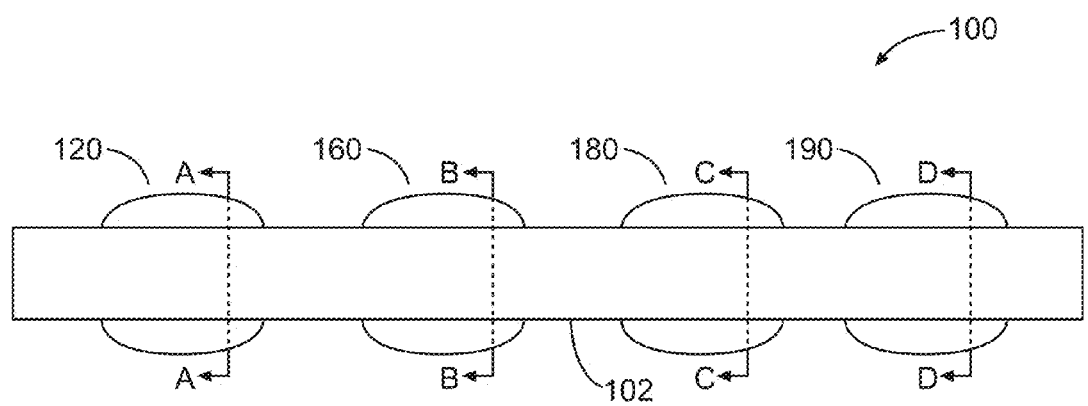
Fig. 1
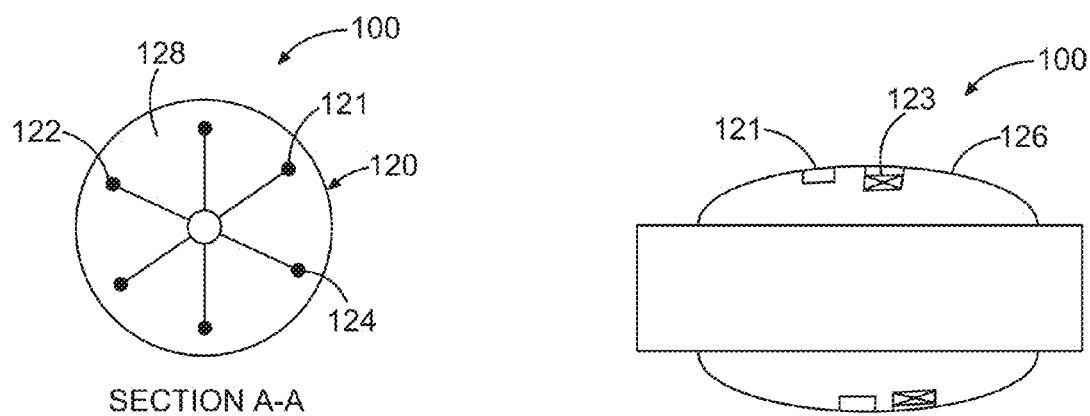
Fig. 2
Fig. 3

SECTION B-B

CAT or RAT
SECTION C-C

SAT
SECTION D-D

DOWNHOLE TEMPERATURE PROBE ARRAY

RELATED APPLICATIONS

This application is a U.S. National Stage Filing under 35 U.S.C. 371 from International Application No. PCT/US2009/057564, filed on Sep. 18, 2009, and published as WO 2011/034542 A1 on Mar. 24, 2011; which application and publication are incorporated herein by reference in their entirety.

TECHNICAL FIELD

The application relates generally to hydrocarbon recovery. In particular, the application relates to downhole temperature probe array usable as part of hydrocarbon recovery.

BACKGROUND

During recovery of hydrocarbons, the determination of the flowing conditions of the fluids in the well bore is useful to optimize the recovery, to evaluate economic viability of the well bore, etc. This determination can include logging during production of the well bore, which involves obtaining logging information about the fluids while the well is flowing. A logging tool instrument package comprising sensors can be lowered into a well, the well is flowed and measurements are taken.

BRIEF DESCRIPTION OF THE DRAWINGS

Embodiments of the invention may be best understood by referring to the following description and accompanying drawings which illustrate such embodiments. In the drawings:

FIG. 1 illustrates a side view of a portion of a downhole tool according to some embodiments.

FIG. 2 illustrates a cross-sectional view of a temperature array probe, taken along 2-2 of FIG. 1.

FIG. 3 illustrates a side view of a portion of a downhole tool according to some embodiments.

DETAILED DESCRIPTION

Figure 6:
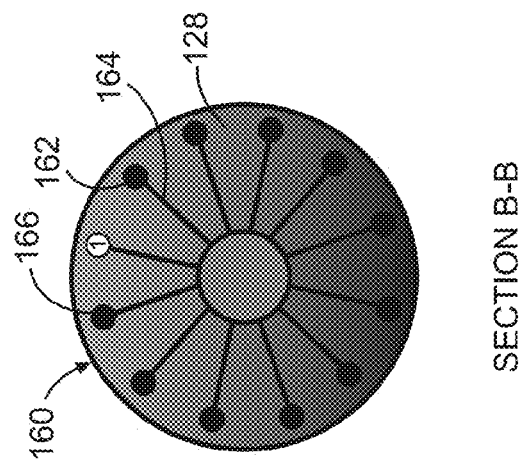
FIG. 6 illustrates a cross-sectional view of a temperature array probe, taken along 6-6 of FIG. 1.

Methods, apparatus and systems that include a temperature probe array for use downhole are described. In the following description, numerous specific details are set forth. However, it is understood that embodiments of the invention may be practiced without these specific details. In other instances, well-known circuits, structures and techniques have not been shown in detail in order not to obscure the understanding of this description. Some embodiments may be used in wireline, Measurement While Drilling (MWD) and Logging While Drilling (LWD) operations.

Some example embodiments include an array of temperature probes in a downhole tool to measure the temperature of fluids within a well bore. These temperatures readings can be used to determine the flowing conditions of the fluids in the well bore. For examples, these temperatures can be used to determine entry points of matter (e.g., gas, liquid, solid, or some combination thereof) from the surrounding earth formations. In particular, these temperatures can be used to determine the distance from the earth's surface of these entry points, which side of the borehole (e.g., top side, bottom side, etc.), etc. Alternatively or in addition, in some example embodiments, these temperatures are used to determine the type of matters within the fluid flow. For example, the temperature is used to determine if a certain part of the flow passing through a temperature probe is gas, oil, water, a mixture thereof, etc. In particular, different matter within the fluid flow can have different temperatures. Accordingly, the temperature can be used in the determination of the different types of flows in the fluid flow.

In some example embodiments, the temperature probes are used in conjunction with other sensors to determine the flowing conditions of the fluids in the well bore. For example, other sensors can measure density, capacitance, resistivity, velocity, or a multiple of combinations to determine holdups, etc. Also, sensors (e.g., spinners, squirters, oxygen activation or a combination thereof) can be used to measure the velocity of the flowing fluids. These sensors can be placed in any number of geometrical configurations around the well bore or tool (depending on the tool string). These geometries can be vertical, horizontal, circular or multiple designs based on the tool string used and the measurement positioned needed. In some example embodiments, multiple tools are used to determine fluid properties, flow conditions, well conditions and other conditions in well bores (such as composition, holdups, velocity, entry and exit points of matters into and from the well bore into the earth formations, etc.).

In some example embodiments, a temperature probe is positioned near a spinner to identify the phase of the fluid. Accordingly, the temperature (measured by the temperature probe) and the velocity (measured by the spinner) can be used to determine the phase of the fluid. Alternatively, the temperature reading can provide redundancy in situations where the spinner fails or is not operational.

In some example embodiments, the temperature probes can be used to identify the relative positioning of certain hardware within the well bore (such as gas lift mandrels, water injection mandrels, etc.). Such information could be useful to a production engineer for future well intervention planning.

FIGS. 1-3 illustrate a downhole tool having a temperature probe array in a temperature probe array tool 120 in a borehole, according to some example embodiments. The downhole tool 100 is configured to operate within a borehole during a period where matter is output from a surrounding earth formation into a flow of matter in the borehole, such as gas, water, or hydrocarbon liquid, or a combination thereof.

The downhole tool 100 includes a main tool body 102 and a temperature probe array tool 120 coupled to the main tool body 102. The temperature probe array tool 120 includes multiple temperature probes 121 located at different circumferential positions around the main tool body 102. In an option, two or more temperature probes are included with the main tool body 102. For example, a first temperature probe 122 and a second temperature probe 124 are configured for positioning in the flow of matter at some distance away from the main tool body 102 during operation. The first temperature probe 122 is at a different circumferential position relative to the second temperature probe 124 during operation, where the first temperature probe 122 and the second temperature probe 124 are configured to measure a first temperature and a second temperature, respectively, during operation, for example at different locations around a borehole. In an option, the multiple probes are disposed within a probe plane 128, and the probe plane 128 is generally transverse to the longitudinal axis of the tool body 102.

In a further option, the temperature probe array includes a third temperature probe, a fourth temperature probe, a fifth temperature probe and a sixth temperature probe configured for positioning in the flow of matter at some distance away from the main tool body during operation, wherein the first temperature probe, the second temperature probe, the third temperature probe, the fourth temperature probe, the fifth temperature probe and the sixth temperature probe are at different circumferential positions relative to each other during operation. The third temperature probe, the fourth temperature probe, the fifth temperature probe and the sixth temperature probe are to measure a third temperature, a fourth temperature, a fifth temperature and a sixth temperature, respectively, during operation, wherein the at least one of a type of matter in the flow and the entry point of the matter from the surrounding earth formation is derived using the third temperature, the fourth temperature, the fifth temperature and the sixth temperature. In an option, the temperature probes are coupled to the main tool body via bow springs.

In an option, the temperature measurements can be made using a fiber fiber-optic cable and laser, and adapting the current Distributed Temperature Survey (DTS) technology to the downhole tool described herein. In an example, the DTS sends laser light along a fiber-optic cable, with the photons interacting with the molecular structure of the fibers, and the incident light scatters. An analysis of Raman backscatter for variation in optical power allows the user to estimate temperature. An analysis of Brillouin backscatter for variation in optical frequency allows the user to estimate temperature along with strain. In an example, the DTS technology has a spatial resolution of about 1 meter which depending upon configuration, and a thermal resolution of about 0.01 degree Celsius.

In an option, at least one of a type of matter in the flow and an entry point of the matter from the surrounding earth formation is derived using the first temperature and the second temperature. In a further option, six or more temperature probes are included, and/or are evenly spaced about the outer circumference of the tool body 102. The six temperature probes obtain information about the borehole. In yet another option, twelve or more temperature probes are included. The temperature profile can be plotted and provides information regarding fluid entry points, temperature anomalies, and the temperature profile provides information on how the material is flowing in the borehole.

FIGS. 2 and 3 illustrate a more detailed view of a temperature probe array that is part of a downhole tool, according to some example embodiments. In an option, at least one temperature probe 121 is mounted on a bow spring 126. In a further option, the at least one temperature probe 121 is mounted adjacent to a spinner 123. In an option, the at least one spinner 123 is configured to measure velocity of the flow of matter, wherein the at least one of the type of matter in the flow and the entry point of the matter from the surrounding earth formation is derived using the velocity measured by the at least one spinner 123.

Figure 4:
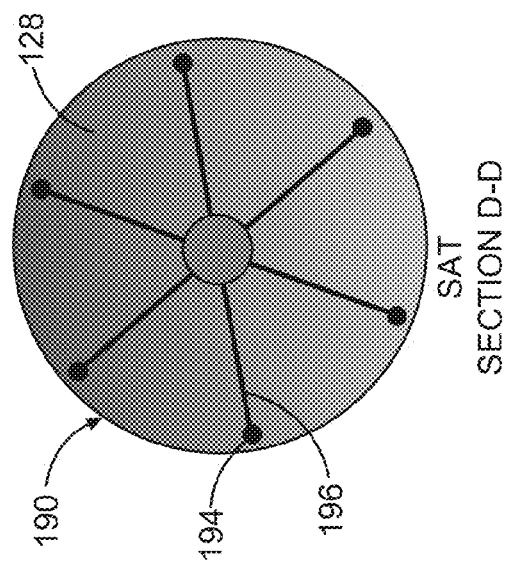
FIG. 4 illustrates a cross-sectional view of a temperature array probe, taken along 4-4 of FIG. 1.

In a further option, as shown in FIG. 4, a cross section of a spinner array tool is shown. In a further option, the downhole tool 100 includes a spinner array tool 190, and includes sensors, such as spinners, which allow for the determination of the fluid velocity of the fluid. Individual phases flow at different velocities and possibly in different directions, depending upon wellbore conditions. The spinner array tool 190 will provide azimuthal information regarding the phase velocity and direction, and when combined with the holdup tools, the flow rate of each phase can be calculated.

For example, the downhole tool includes a spinner array tool 190 includes multiple members which allow for the direction of the fluid and the velocity of the fluid to be determined. In an example, the spinner array tool 190 includes six miniature turbines 194 radially disposed about an outer circumference of the tool. For instance, the turbines 194 are disposed along bowspring arms 196, which allows for the determination of the fluid velocities and direction. In a further option, low friction jeweled bearings are used to reduce the mechanical threshold of the turbines 194 and to improve the sensitivity to the fluid flow.

In a further option, the spinner array tool 190 is calibrated cross plotting the spinner rps vs. the cable speed using different logging passes. The slopes and thresholds are determined for each turbine 194 by using both the down and up passes. In a further option, a combination of slopes and thresholds are used.

Figure 5:
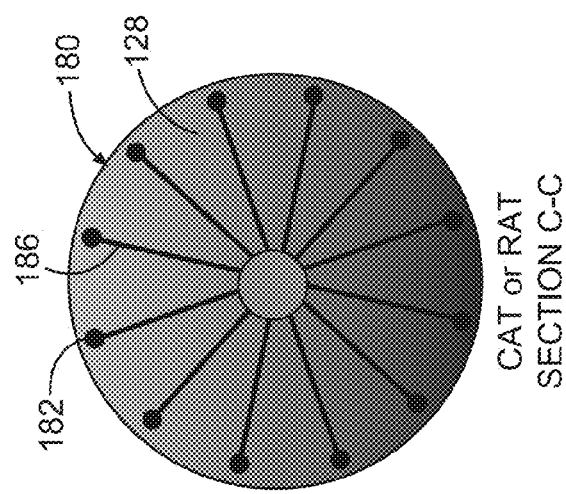
FIG. 5 illustrates a cross-sectional view of a temperature array probe, taken along 5-5 of FIG. 1.

In a further option, the downhole tool further includes a resistivity array tool 180, as shown in FIG. 5. The resistivity array tool 180 includes multiple sensors such as an array of multiple sensors 182, which are disposed on members such as bowspring arms 186. In an option, the resistivity array tool includes an array of twelve sensors. The sensors measure the resistance of the material or liquid in which they are placed. For instance, the sensors 182 can differentiate between the conductive water and the non-conductive hydrocarbons. The sensor design detects very small, fast moving bubbles. In an option, the downhole tool, such as a production logging tool string, can rotate in the wellbore, and differences in each sensors measurement between logging passes may be the combined effects of the sensor being in a different azimuthal orientation, changes in flow regime, or holdup. In a further option, the sensors 182 each provide a mean value and a standard deviation for the resistance values for the period being summarized.

In a further option, the downhole tool further includes a capacitance array tool 160, as shown in FIG. 6. The capacitance array tool 160 includes multiple sensors such as an array of multiple sensors 162 mounted on bow springs 166. In an option, the capacitance array tool includes an array of twelve sensors. The sensors measure the capacitance of the material or liquid in which they are placed. In an option, the downhole tool, such as a production logging tool string, can rotate in the wellbore, and differences in each sensors measurement between logging passes may be the combined effects of the sensor being in a different azimuthal orientation, changes in flow regime, or holdup. In a further option, the sensors 162 each provide a mean value and a standard deviation for the capacitance values for the period being summarized.

Figure 7:
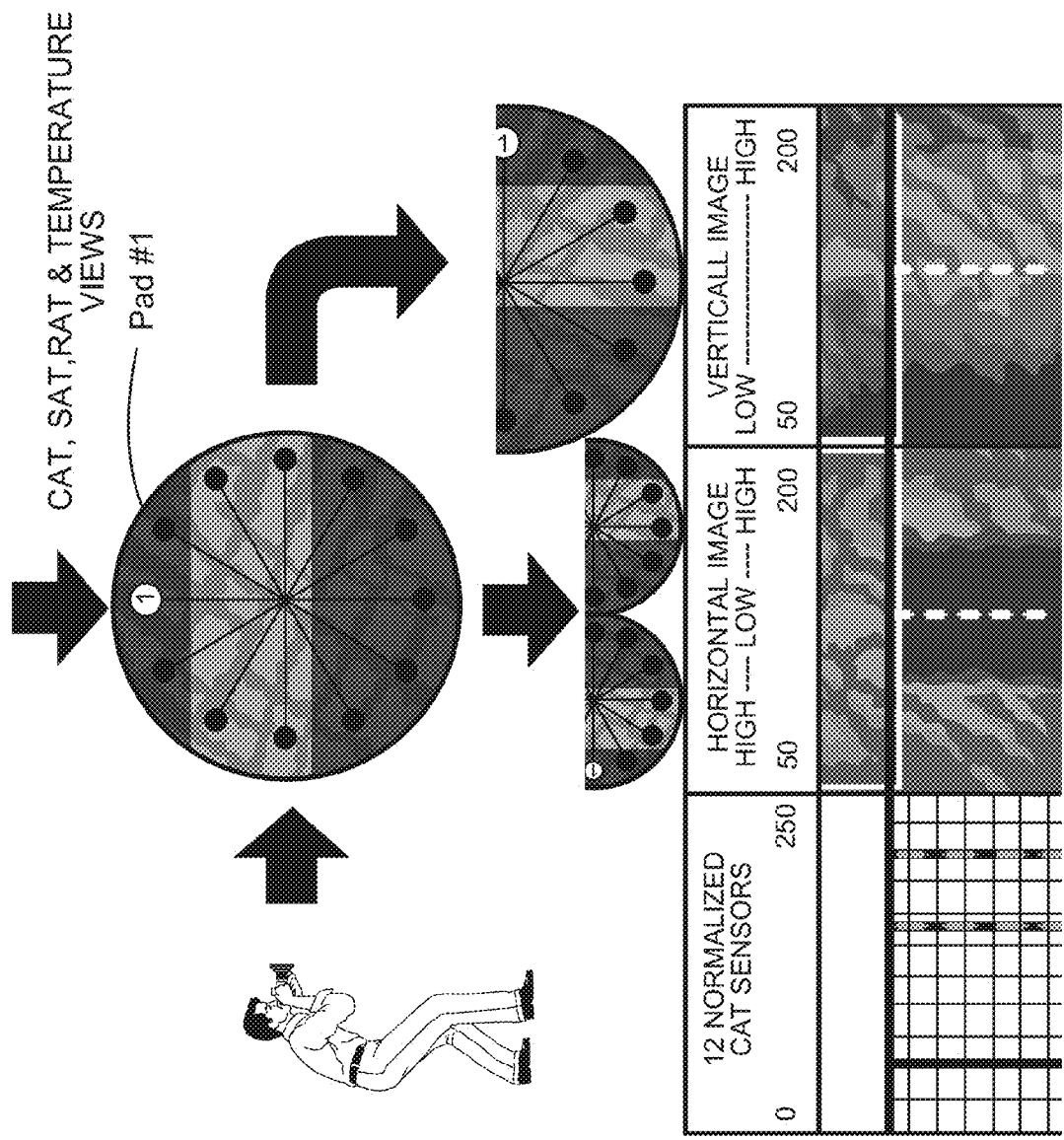
FIG. 7 illustrates an example of data plotted from the sensors according to some embodiments.
Figure 8:
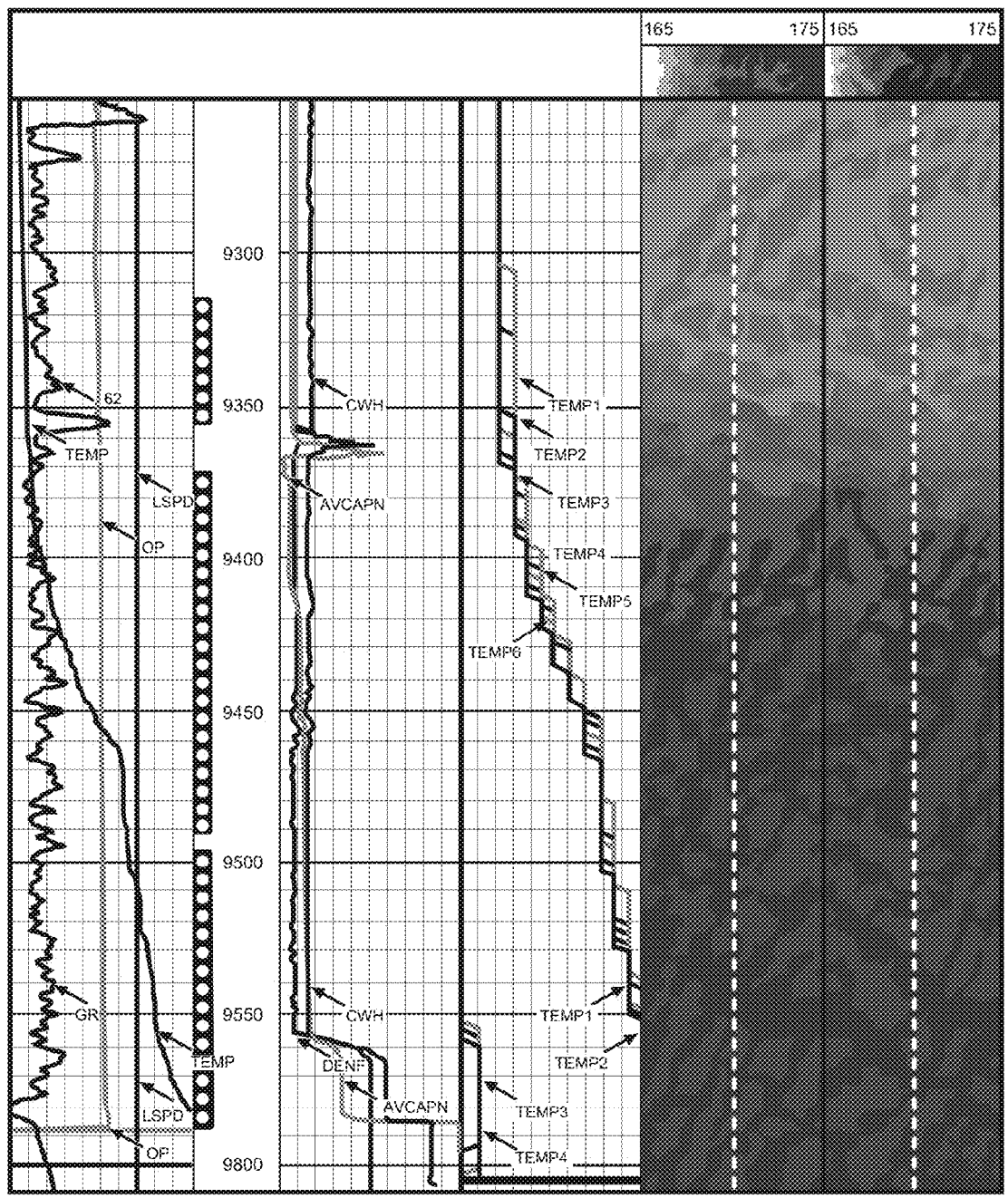
FIG. 8 illustrates another example of data plotted from the sensors according to some embodiments.

The data from the resistivity array tool 180, the spinner array tool 190, the capacitance array tool 160, and the temperature probe array tool 120 can be used to make interpretations of the fluid by using each tool individually, and/or the data from the tools 180, 190, 120, 160 can be used collectively. For instance, the capacitance array tool 160 and resistivity array tool 180 can provide multiple holdup measurements, such as 24 holdup measurements, and the spinner array tool 190 and the temperature probe array can provide multiple velocity and temperature measurements, a complete flow analysis can be done. FIGS. 7 and 8 illustrate examples of the information that is plotted graphically by taking a snap shot of the cross section of the various tools. FIG. 8 illustrates the types of charts that can be created using the information collected by the various probes. For instance, track one includes information regarding the gamma ray log. Track two includes the capacitance data, or the hold-up information. Track three is the raw temperature data measured by the temperature probe. The temperature curves, taken from the temperature probes, such as, but not limited to, the six temperature probes, are then used to create the standard horizontal image in track five, and the vertical image in track six, 199. The temperature information can be used to help determine the type of fluids in the well bore, and where the different types of fluids are coming into the well bore.

A method includes positioning a tool, such as a wireline tool that is operable during a wireline operation, within a borehole during a period wherein matter is being output from a surrounding earth formation into a flow of matter in the borehole, where the temperature probe array includes at least a first temperature probe and a second temperature probe configured for positioning in the flow of matter at some distance away from the main tool body during operation. The first temperature probe is radially spaced from and is at a different circumferential position relative to the second temperature probe during operation. The first and second temperature probes are in a fixed position with respect to the longitudinal axis of the main tool body. The method further includes measuring a first temperature and a second temperature using the first temperature probe and the second temperature probe, respectively. The method also includes determining at least one of a type of matter in the flow and an entry point of the matter from the surrounding earth formation using the first temperature and the second temperature. The at least one of the type of matter in the flow comprises gas, water and liquid that includes a hydrocarbon, and the entry point comprises a distance relative to the surface of the earth and/or the entry point comprises a top side or a bottom side of the borehole.

Options for the method include measuring a velocity of the flow of matter in the borehole in a spinner that is coupled to the tool, wherein determining the at least one of a type of matter in the flow and the entry point of the matter from the surrounding earth formation comprises determining the at least one of a type of matter in the flow and the entry point of the matter from the surrounding earth formation using the velocity of the flow of matter in the borehole.

Figure 10:
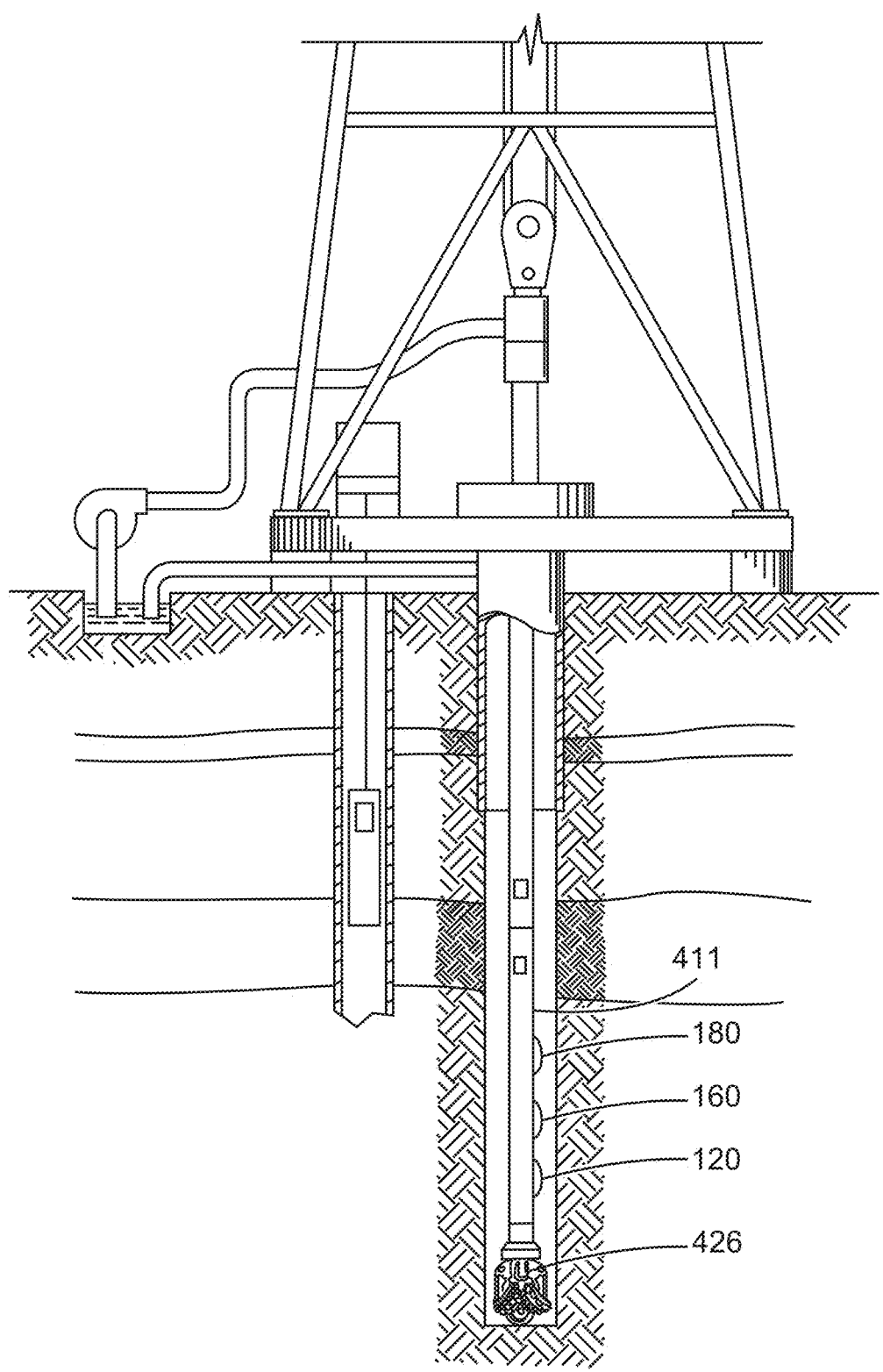
FIG. 10 illustrates a drilling well during Measurement While Drilling (MWD) operations, Logging While Drilling (LWD) operations or Surface Data Logging (SDL) operations, according to some embodiments.

Wellsite operating environments, according to some embodiments in which the above-described measurement techniques and systems can be used, are now described. FIG. 10 illustrates a drilling well during Measurement While Drilling (MWD) operations, Logging While Drilling (LWD) operations or Surface Data Logging (SDL) operations, according to some embodiments. The system may also form a portion of a drilling rig located at a surface of a well. The drilling rig may provide support for a drill string. The drill string may operate to penetrate a rotary table for drilling a borehole through subsurface formations. The drill string may include a Kelly, drill pipe, and a bottom hole assembly, perhaps located at the lower portion of the drill pipe. One or more of the resistivity array tool, the spinner array tool, the capacitance array tool, and the temperature probe array tool are included with the main tool body.

The bottom hole assembly may include drill collars, a downhole tool, and a drill bit. The drill bit may operate to create a borehole by penetrating the surface and subsurface formations. The downhole tool may comprise any of a number of different types of tools including MWD (measurement while drilling) tools, LWD (logging while drilling) tools, and others.

During drilling operations, the drill string (perhaps including the Kelly, the drill pipe, and the bottom hole assembly) may be rotated by the rotary table. In addition to, or alternatively, the bottom hole assembly may also be rotated by a motor (e.g., a mud motor) that is located downhole. The drill collars may be used to add weight to the drill bit. The drill collars also may stiffen the bottom hole assembly to allow the bottom hole assembly to transfer the added weight to the drill bit, and in turn, assist the drill bit 426 in penetrating the surface and subsurface formations.

During drilling operations, a mud pump may pump drilling fluid (sometimes known by those of skill in the art as "drilling mud") from a mud pit through a hose into the drill pipe and down to the drill bit. The drilling fluid can flow out from the drill bit and be returned to the surface through an annular area between the drill pipe and the sides of the borehole. The drilling fluid may then be returned to the mud pit, where such fluid is filtered. In some embodiments, the drilling fluid can be used to cool the drill bit, as well as to provide lubrication for the drill bit during drilling operations. Additionally, the drilling fluid may be used to remove subsurface formation cuttings created by operating the drill bit.

Figure 11:
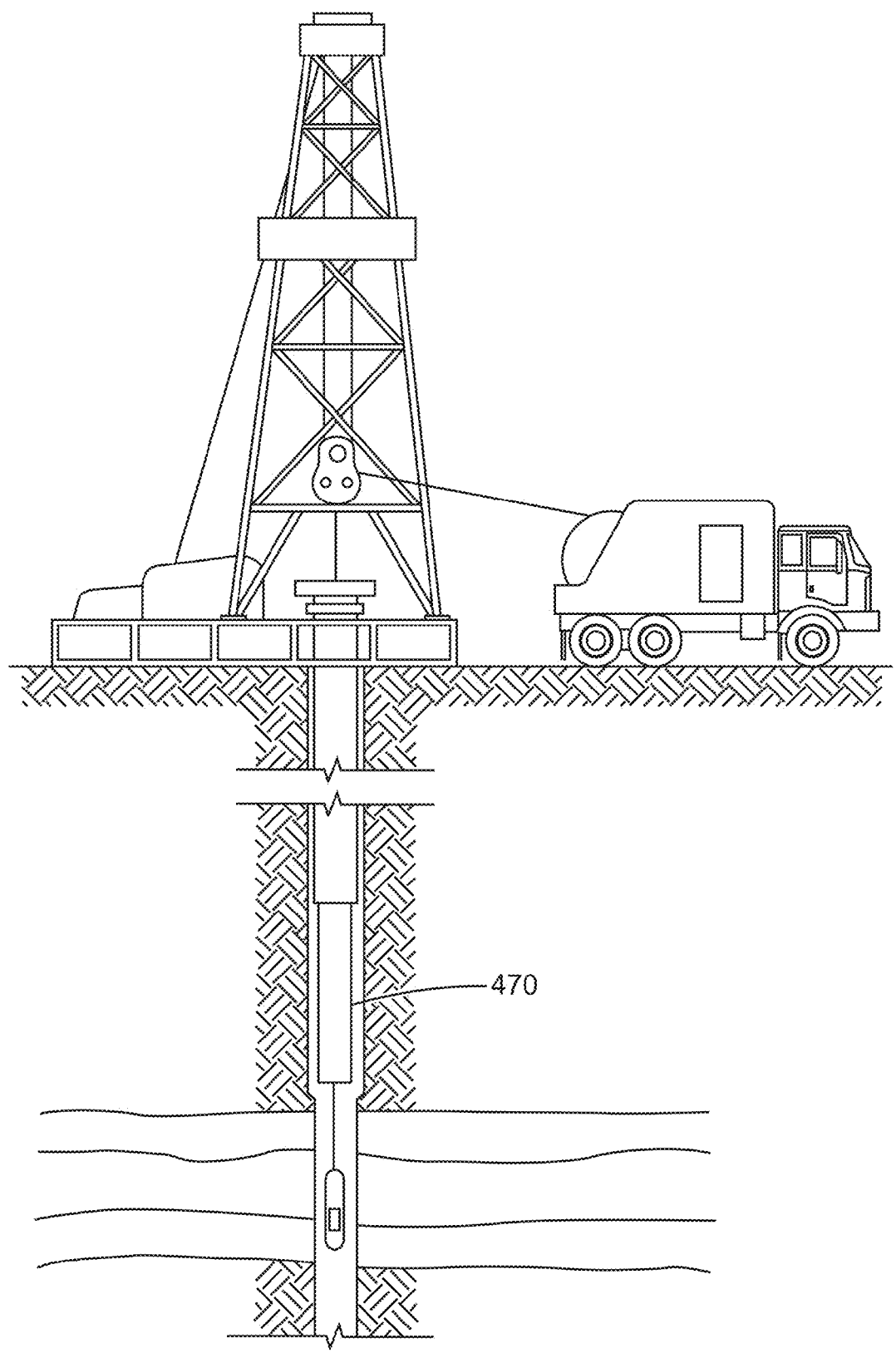
FIG. 11 illustrates a drilling well during wireline logging operations, according to some embodiments.

FIG. 11 illustrates a drilling well during wireline logging operations, according to some embodiments, where one or more of the above-discussed tools, such as the temperature probe array tool, are included. A drilling platform is equipped with a derrick that supports a hoist. Drilling of oil and gas wells is commonly carried out by a string of drill pipes connected together so as to form a drilling string that is lowered through a rotary table into a wellbore or borehole. Here it is assumed that the drilling string has been temporarily removed from the borehole to allow a wireline logging tool body, such as a probe or sonde, to be lowered by wireline or logging cable into the borehole. Typically, the tool body is lowered to the bottom of the region of interest and subsequently pulled upward at a substantially constant speed. During the upward trip, instruments included in the tool body may be used to perform measurements on the subsurface formations adjacent the borehole as they pass by. The measurement data can be communicated to a logging facility for storage, processing, and analysis. The logging facility may be provided with electronic equipment for various types of signal processing. Similar log data may be gathered and analyzed during drilling operations (e.g., during Logging While Drilling, or LWD operations).

The apparatus such as the downhole tool; fluid sampling device; pressure measurement device; sensor section; fluid path; attachment assembly; processor; logic; data acquisition system; computer workstations; systems; tool body;

logging cable; drilling platform; derrick; hoist; logging facility; display; drilling rig; surface; well; drill string; rotary table; borehole; Kelly; drill pipe; bottom hole assembly; drill collars; drill bit; mud pump; mud pit; hose; and annular area may all be characterized as "modules" herein. Such modules may include hardware circuitry, and/or a processor and/or memory circuits, software program modules and objects, and/or firmware, and combinations thereof, as desired by the architect of the apparatus and systems, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Such apparatus and systems may further be included as sub-components within a variety of electronic systems, such as televisions, cellular telephones, personal computers, workstations, radios, video players, vehicles, signal processing for geothermal tools and smart transducer interface node telemetry systems, among others. Some embodiments include a number of methods.

Figure 9:
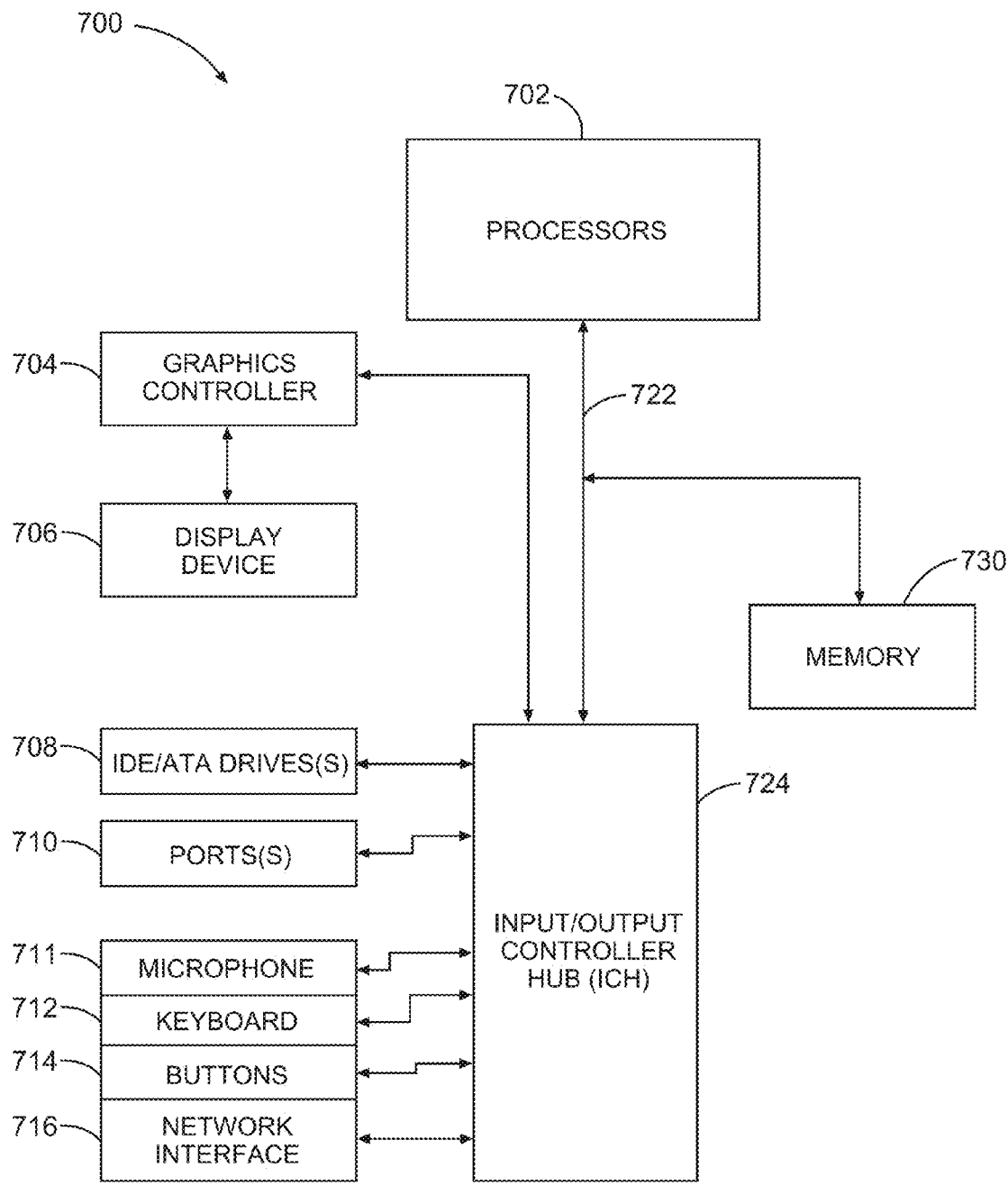
FIG. 9 illustrates a block diagram, according to some embodiments.

A detailed block diagram of an example computer environment, according to some embodiments, is now described. In particular, FIG. 9 illustrates a computer that may be used for determining fluid profiles and entry points of fluids using temperatures, according to some example embodiments. A computer system 700 may be representative of some or all of the components used either downhole or at the surface of the earth to determine organic carbon content. For example, some of the components of the computer system 700 are incorporated into a logging tool downhole.

As illustrated in FIG. 9, the computer system 700 comprises processor(s) 702. The computer system 700 also includes a memory unit 730, processor bus 722, and Input/Output controller hub (ICH) 724. The processor(s) 702, memory unit 730, and ICH 724 are coupled to the processor bus 722. The processor(s) 702 may comprise any suitable processor architecture. The computer system 700 may comprise one, two, three, or more processors, any of which may execute a set of instructions to implement the various method embodiments of the invention.

The memory unit 730 may store data and/or instructions, and may comprise any suitable memory, such as a dynamic random access memory (DRAM). The computer system 700 also includes IDE drive(s) 708 and/or other suitable storage devices. A graphics controller 704 controls the display of information on a display device 706, according to some embodiments.

The input/output controller hub (ICH) 724 provides an interface to I/O devices or peripheral components for the computer system 700. The ICH 724 may comprise any suitable interface controller to provide for any suitable communication link to the processor(s) 702, memory unit 730 and/or to any suitable device or component in communication with the ICH 724. For one embodiment of the invention, the ICH 724 provides suitable arbitration and buffering for each interface.

For some embodiments, the ICH 724 provides an interface to one or more suitable integrated drive electronics (IDE) drives 708, such as a hard disk drive (HDD) or compact disc read only memory (CD ROM) drive, or to suitable universal serial bus (USB) devices through one or more USB ports 710. For one embodiment, the ICH 724 also provides an interface to a keyboard 712, a mouse 714, a CD-ROM drive 718, one or more suitable devices through one or more FireWire® ports 716. For one embodiment of the invention, the ICH 724 also provides a network interface 720 though which the computer system 700 can communicate with other computers and/or devices.

In some embodiments, the computer system 700 includes a machine-readable medium that stores a set of instructions (e.g., software) embodying any one, or all, of the methodologies for described herein. Furthermore, software may reside, completely or at least partially, within memory unit 730 and/or within the processor(s) 702.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:
1. An apparatus comprising:
a tool configured to operate within a borehole during a period wherein matter is being output from a surrounding earth formation into a flow of matter in the borehole, wherein the tool comprises, a main tool body having a longitudinal axis; and a temperature probe array coupled to and spaced apart from the main tool body, where the temperature probe array includes at least a first temperature probe and a second temperature probe configured for positioning in the flow of matter around the main tool body at a distance away from the main tool body during operation such that matter flows in the spaced apart region between the main tool body and each of the first and second temperature probes, the first temperature probe is at a different circumferential position around the main tool body relative to the second temperature probe during operation, the first and second temperature probes are in a fixed circumferential position with respect to the longitudinal axis of the main tool body, wherein the first temperature probe and the second temperature probe are configured to measure a first temperature and a second temperature, respectively, during operation, and wherein at least one type of matter in the flow from the surrounding earth formation is derived using the first temperature and the second temperature.

2. The apparatus of claim 1, further comprising wherein the temperature probe array comprises multiple probes disposed within a probe plane, where the probe plane is generally transverse to the longitudinal axis of the tool body, wherein the multiple probes include the first temperature probe and the second temperature probe.

3. The apparatus of claim 1, wherein the tool comprises at least one spinner that is configured to measure velocity of the flow of matter, and wherein the at least one type of matter in the flow or an entry point of the matter from the surrounding earth formation is derived using the velocity measured by the at least one spinner.

4. The apparatus of claim 1, wherein the tool comprises a wireline tool that is operable during a wireline operation.

5. The apparatus of claim 1, wherein the temperature probe array includes a third temperature probe, a fourth temperature probe, a fifth temperature probe and a sixth temperature probe configured for positioning in the flow of matter around the main tool body during operation, wherein the first temperature probe, the second temperature probe, the third temperature probe, the fourth temperature probe, the fifth temperature probe and the sixth temperature probe are at different circumferential positions relative to each other during operation, wherein the third temperature probe, the fourth temperature probe, the fifth temperature probe and the sixth temperature probe are to measure a third temperature, a fourth temperature, a fifth temperature and a sixth temperature, respectively, during operation, wherein the at least one type of matter in the flow and an entry point of the matter from the surrounding earth formation is derived using the third temperature, the fourth temperature, the fifth temperature and the sixth temperature.

6. The apparatus of claim 1, wherein the first temperature probe and the second temperature probe are coupled to the main tool body through a first bow spring and a second bow spring, respectively.

7. A method comprising:
positioning a tool, coupled to and spaced apart from a temperature probe array, within a borehole during a period wherein matter is being output from a surrounding earth formation into a flow of matter in the borehole, where the temperature probe array includes at least a first temperature probe and a second temperature probe configured for positioning in the flow of matter around the main tool body at a distance away from the main tool body during operation such that matter flows in a spaced apart region between the main tool body and each of the first and second temperature probes, the first temperature probe being at a different circumferential position around the main tool body relative to the second temperature probe during operation, the first and second temperature probes being in a fixed circumferential position with respect to the longitudinal axis of the main tool body;
measuring a first temperature and a second temperature using the first temperature probe and the second temperature probe, respectively; and
determining at least one type of matter in the flow from the surrounding earth formation using the first temperature and the second temperature.

8. The method of claim 7, wherein the at least one type of matter in the flow comprises gas, water, or liquid that includes a hydrocarbon.

9. The method of claim 7, wherein the method includes determining an entry point of the matter from the surrounding earth formation using the first temperature and the second temperature, the entry point comprises a distance relative to a surface of the earth.

10. The method of claim 7, further comprising measuring a velocity of the flow of matter in the borehole using a spinner that is coupled to the tool, wherein determining the at least one type of matter in the flow and determining an entry point of the matter from the surrounding earth formation comprises determining the at least one type of matter in the flow and the entry point of the matter from the surrounding earth formation using the velocity of the flow of matter in the borehole.

11. The method of claim 7, wherein measuring the first temperature and the second temperature includes sending laser light along a fiber optic cable, and analyzing backscatter.

12. A machine-readable memory unit having instructions stored thereon which, when executed by a machine, cause said machine to perform operations comprising:
receiving from a temperature probe array a first temperature reading and a second temperature reading measured by a first temperature probe and a second temperature probe, respectively, the first and the second temperature probes coupled to and spaced apart from a tool that is positioned within a borehole such that the first temperature probe and the second temperature probe are at a distance away from the tool and are in a flow of matter in the borehole such that matter flows in a spaced apart region between the tool and each of the first and second temperature probes during a period when the first temperature and the second temperature are measured, the first temperature probe being at a different circumferential position around the main tool body relative to the second temperature probe during operation, the first and second temperature probes being in a fixed circumferential position with respect to the longitudinal axis of the main tool body; and
determining a fluid profile of matter type for the flow of matter from the surrounding earth formation into the borehole, using the first temperature and the second temperature.

13. The machine-readable memory unit of claim 12, wherein the matter type in the flow includes gas, water, or liquid having a hydrocarbon.

14. The machine-readable memory unit of claims 12, wherein the operations include determining an entry point of the matter type from the surrounding earth formation using the first temperature and the second temperature, the entry point comprises a top side or a bottom side of the borehole.

15. The machine-readable memory unit of claim 12, wherein the operations further comprise receiving a velocity of the flow of matter measured by a spinner that is coupled to the tool, wherein determining the fluid profile of matter type for the flow of matter and determining an entry point of the matter from the surrounding earth formation comprises using the velocity of the flow of matter in the borehole.

16. A system comprising:
   a temperature probe array that is coupled to and spaced apart from a tool configured to operate in a borehole during a period wherein a flow of matter is flowing in the borehole, wherein the temperature probe array includes a first temperature probe and a second temperature probe configured for positioning in the flow of matter around a main tool body of the tool at a distance away from the main tool body during operation such that matter flows in the spaced apart region between the main tool body and the temperature probes, wherein the first temperature probe is at a different circumferential position around the main tool body relative to the second temperature probe during operation, and the first and second temperature probes are in a fixed circumferential position with respect to a longitudinal axis of the main tool body, wherein the first temperature probe and the second temperature probe are configured to measure a first temperature and a second temperature, respectively, during operation; and
   a processor communicatively coupled to the temperature probe array and configured to receive the first temperature and the second temperature, wherein the processor is configured to determine a fluid profile of matter type in the flow of matter in the borehole from a surrounding earth formation derived from the first temperature and the second temperature.

17. The system of claim 16, wherein the first temperature probe and the second temperature probe are coupled to the main tool body through a first bow spring and a second bow spring, respectively.

18. The system of claim 16, wherein the fluid profile of matter type of matter in the flow includes gas, water, or liquid having a hydrocarbon.

19. The system of claim 16, further comprising one or more of a capacity array tool or a resistivity array tool, the capacity array tool or the resistivity array tool coupled to the tool configured to operate in the borehole.

20. The system of claim 16, further comprising a spinner coupled to the tool, wherein the spinner is configured to measure velocity of the flow of matter, and wherein the processor is configured to determine the fluid profile of matter type of the flow of matter and to determine an entry point of the matter from the surrounding earth formation derived using the velocity measured by the spinner.

\* \* \* \* \*